United States Patent
Quoniam et al.

(10) Patent No.: US 10,462,954 B2
(45) Date of Patent: Nov. 5, 2019

(54) QUICK HITCH ASSEMBLY

(71) Applicant: AGCO International GmbH, Hesston, KS (US)

(72) Inventors: Francois Quoniam, Beauvais (FR); Philippe Boittin, Laboissiere en Thell (FR); Mathieu Joel Baudoin, Beauvais (FR)

(73) Assignee: AGCO International GmbH, Neuhausen (CH)

( * ) Notice: Subject to any disclaimer, the term of this patent is extended or adjusted under 35 U.S.C. 154(b) by 24 days.

(21) Appl. No.: 15/533,066

(22) PCT Filed: Dec. 9, 2015

(86) PCT No.: PCT/EP2015/079104
§ 371 (c)(1),
(2) Date: Jun. 5, 2017

(87) PCT Pub. No.: WO2016/091942
PCT Pub. Date: Jun. 16, 2016

(65) Prior Publication Data
US 2018/0070524 A1    Mar. 15, 2018

(30) Foreign Application Priority Data
Dec. 12, 2014  (EP) ..................... 14290383

(51) Int. Cl.
*A01B 59/06*    (2006.01)

(52) U.S. Cl.
CPC .......... *A01B 59/062* (2013.01); *A01B 59/066* (2013.01); *A01B 59/064* (2013.01)

(58) Field of Classification Search
CPC .... A01B 59/043; A01B 59/062; A01B 59/066
USPC .......................................... 172/272
See application file for complete search history.

(56) References Cited

U.S. PATENT DOCUMENTS

| | | | |
|---|---|---|---|
| 3,231,294 | A | 1/1966 | Horney |
| 3,427,046 | A | 2/1969 | Sommer et al. |
| 3,829,128 | A | 8/1974 | Sutton |
| 6,533,042 | B1 | 3/2003 | Marine, Sr. et al. |
| 2006/0081382 | A1 | 4/2006 | Tuttle et al. |

FOREIGN PATENT DOCUMENTS

DE    11 34 235 B    8/1962

OTHER PUBLICATIONS

UK Intelletual Property Office, International Search Report for related UK Application No. GB1423048.6, dated May 27, 2015.
European Patent Office, International Search Report for Parent International Application No. PCT/EP2015/079104, dated Feb. 17, 2016.

*Primary Examiner* — Thomas B Will
*Assistant Examiner* — Joel F. Mitchell

(57) ABSTRACT

An adjustable width quick hitch assembly for an agricultural vehicle. The quick hitch assembly is provided with spacer elements which can be incorporated into the assembly as required, where the selection and positioning of the spacer elements results in an assembled quick hitch having various hitch widths.

11 Claims, 5 Drawing Sheets

US 10,462,954 B2

QUICK HITCH ASSEMBLY

BACKGROUND OF THE INVENTION

Field of the Invention

The present invention relates to a quick hitch assembly for an agricultural vehicle.

Description of Related Art

Quick hitches are provided as an easy-to-use interface between a three-point-linkage of an agricultural tractor and a further tractor implement. The quick hitch allows for relatively easy coupling of the implement to the tractor, without excessive amounts of time-consuming positioning and alignment of the linkages of the tractor. In a further aspect, the use of quick hitches having adjustable dimensions allows for the quick hitch to accommodate the coupling of various tractor implements of various configurations and dimensions.

An example of an adjustable quick hitch is provided in U.S. Pat. No. 7,487,843, which allows for the formation of a quick hitch having a variable hitch width, defined between the distal ends of the legs of the quick hitch. The adjustment of the hitch width is provided by adjustably mounting the legs of the quick hitch onto a crossbar. However, the selection of the different hitch widths requires an operator to visually align a bolt aperture on the legs with one of a series of corresponding apertures on the crossbar, which may present difficulties to the operator, and may result in incorrect alignments and time-consuming correction of mistakes.

It is an object of the invention to address these problems.

OVERVIEW OF THE INVENTION

Accordingly, there is provided a quick hitch assembly comprising:

a top link portion; and a pair of side arm portions to be coupled with the top link portion to form an assembled quick hitch, wherein the assembly further comprises spacer elements to be selectably arranged between the top link portion and the side arm portions, the spacer elements allowing for the formation of different configurations of assembled quick hitch having different quick hitch dimensions.

The use of spacer elements which can be relatively easily swapped into and out of a quick hitch assembly, results in a simple and efficient mechanism to provide for a quick hitch of adjustable dimensions.

Preferably, a quick hitch width is defined between the distal ends of the side arm portions when the side arm portions are coupled to the top link portion to form an assembled quick hitch, wherein the spacer elements are selectably arranged between the top link portion and the side arm portions to define different quick hitch widths.

Varying the width of the quick hitch allows for a variety of implements of differing sizes to be easily coupled to an agricultural vehicle.

Preferably, the quick hitch assembly comprises at least one pair of spacer elements.

The assembly may comprise a single matched pair of spacer elements, to provide a quick hitch assembly effectively having two quick hitch widths—a first width when the spacers are used in the assembly, and a second width when the spacers are not used in the assembly. The assembly may alternatively comprise a plurality of pairs of spacer elements, the different pairs of the plurality having different dimensions to provide for different quick hitch widths.

Preferably, the assembled quick hitch comprises a generally horizontal upper section and generally vertical side sections, wherein the side arm portions each comprise an upper end for coupling to the top link portion of the assembly and a lower end comprising a hitch hook element, wherein the lower end of the side arm portion is horizontally offset from the upper end of the side arm portion.

Providing an arm construction having a horizontal offset between the upper and lower ends of the arm allows for the quick hitch widths between the distal ends of the side arm portions to be wider than the generally horizontal upper section of the assembly. Such a construction permits the use of the quick hitch assembly on a vehicle where the hitch location may be restricted, e.g. due to the presence of wheel fenders, etc.

Preferably, the side arm portions arranged to be releasably bolted to the top link portion, and wherein the spacer elements comprise at least one through-going bolt aperture, such that spacer elements can be arranged between a side arm portion and the top link portion, where a securing bolt is arranged to extend through the aperture of the spacer element to secure the spacer element between the side arm portion and the top link portion.

In a preferred aspect, the top link portion and the side arm portions comprise complementary coupling faces comprising a first vertical face section, a second vertical face section offset from the first vertical face section, and an angled face section extending between the first and second sections.

Preferably, the spacer elements comprise dogleg-shaped elements formed to correspond to the coupling faces of the top link portion and the respective side arm portions.

Preferably, the spacer elements are stored on the side arm portions when not in use.

Preferably, the spacer elements are releasably bolted to the side arm portions when not in use.

Preferably, the spacer elements are releasably bolted onto at least one of the side arm portions by a securing bolt, the securing bolt used to attach the at least one side arm portion to the top link portion.

Preferably, the side arm portions comprise a recess shaped to receive a spacer element when the spacer element is not in use.

There is also provided an agricultural vehicle, preferably an agricultural tractor, having a quick hitch assembly as described above.

It will be understood that the quick hitch assembly may be used on a rear three-point-linkage of a tractor, and/or on a front three-point-linkage of a tractor.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
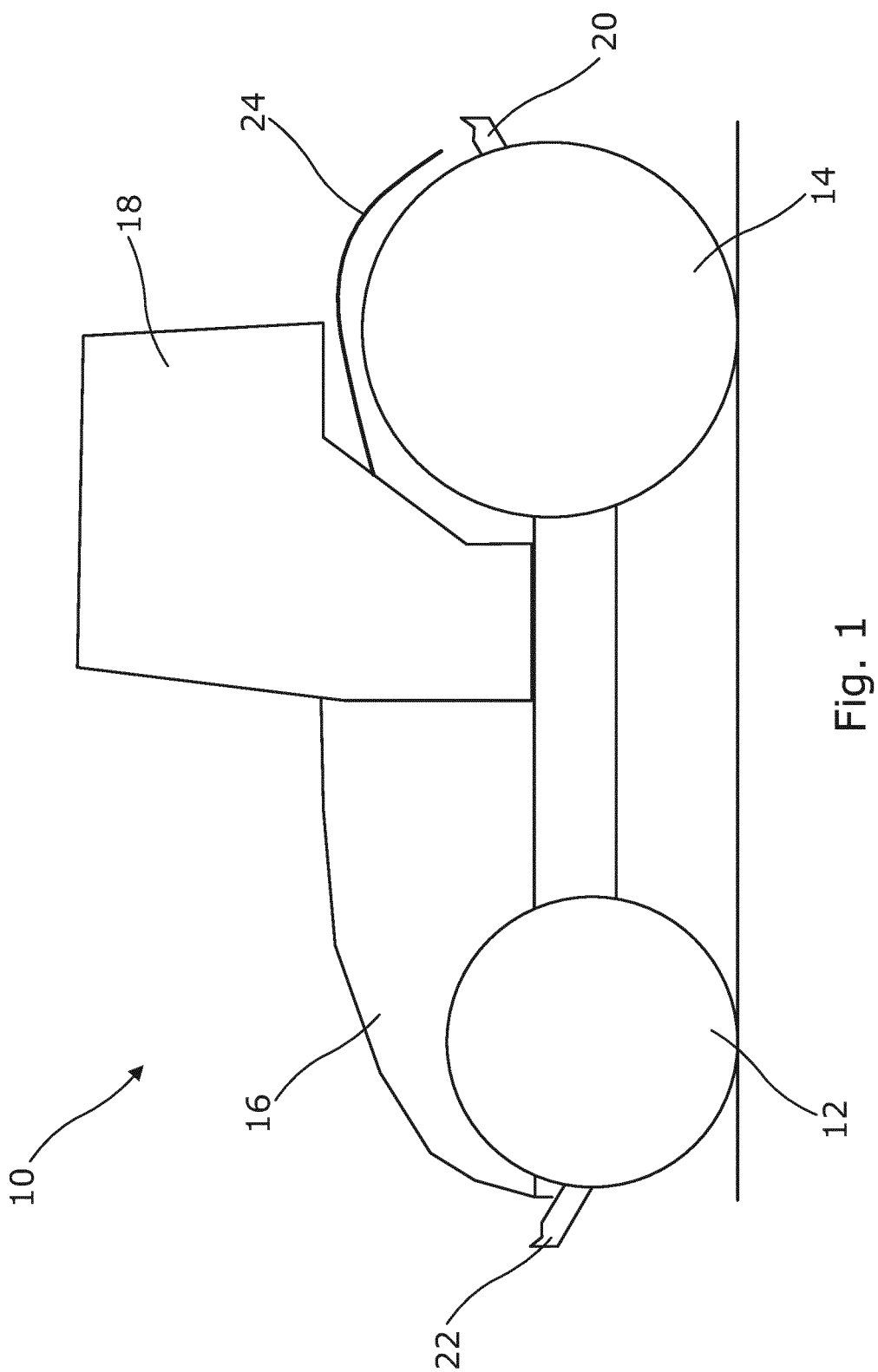
FIG. 1 is an illustration of an agricultural tractor.

With reference to FIG. 1, an agricultural tractor is indicated at 10. The tractor 10 comprises front wheels 12, rear wheels 14, an engine section 16 and a cab section 18. A rear linkage 20 is provided at the rear of the tractor 10, and a front linkage 22 is provided at the front of the tractor 10. Rear fenders 24 are provided to cover a portion of the rear wheels 14.

Figure 2:
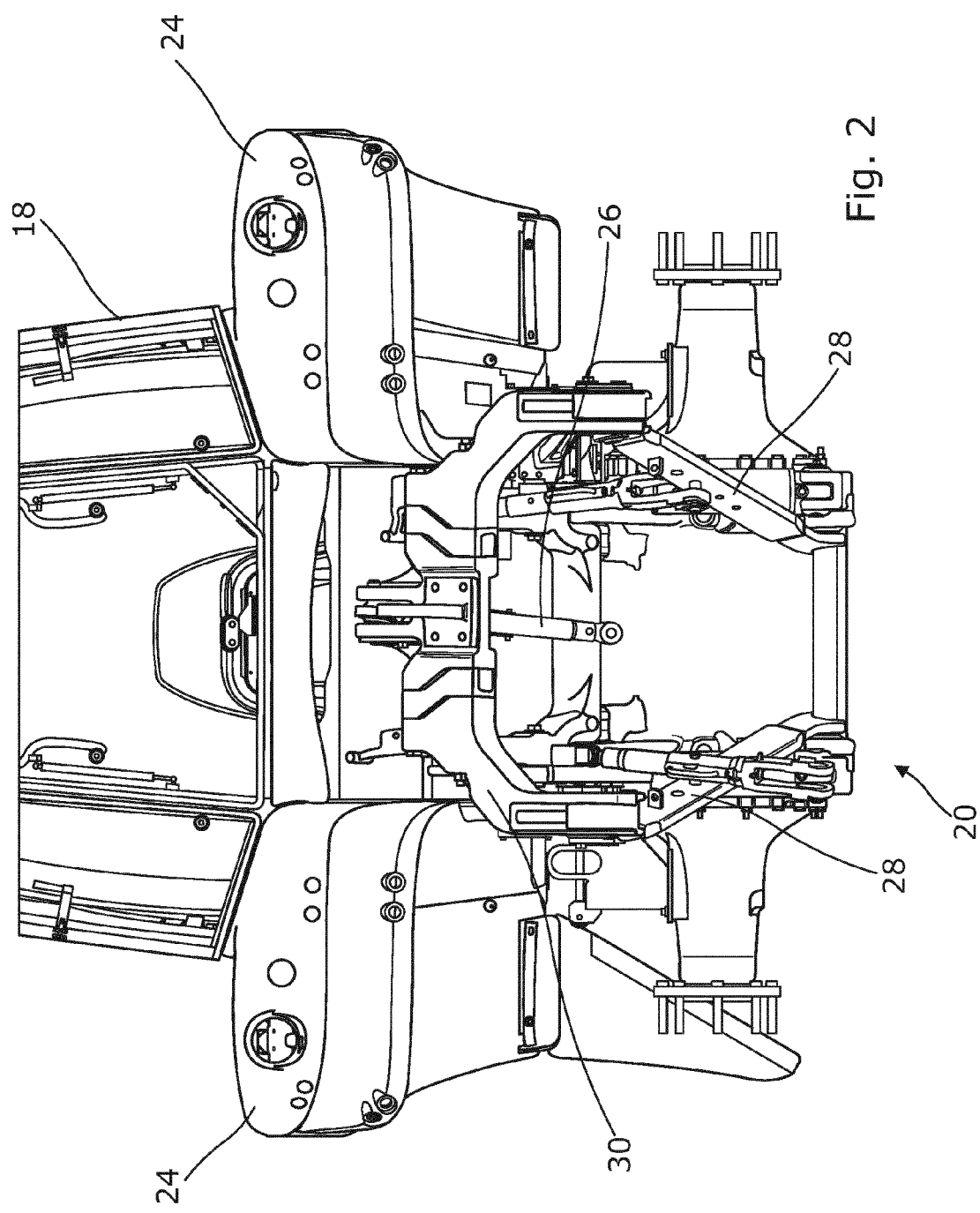
FIG. 2 is a rear sectional view of an agricultural tractor having a quick hitch assembly according to the invention.
Figure 3:
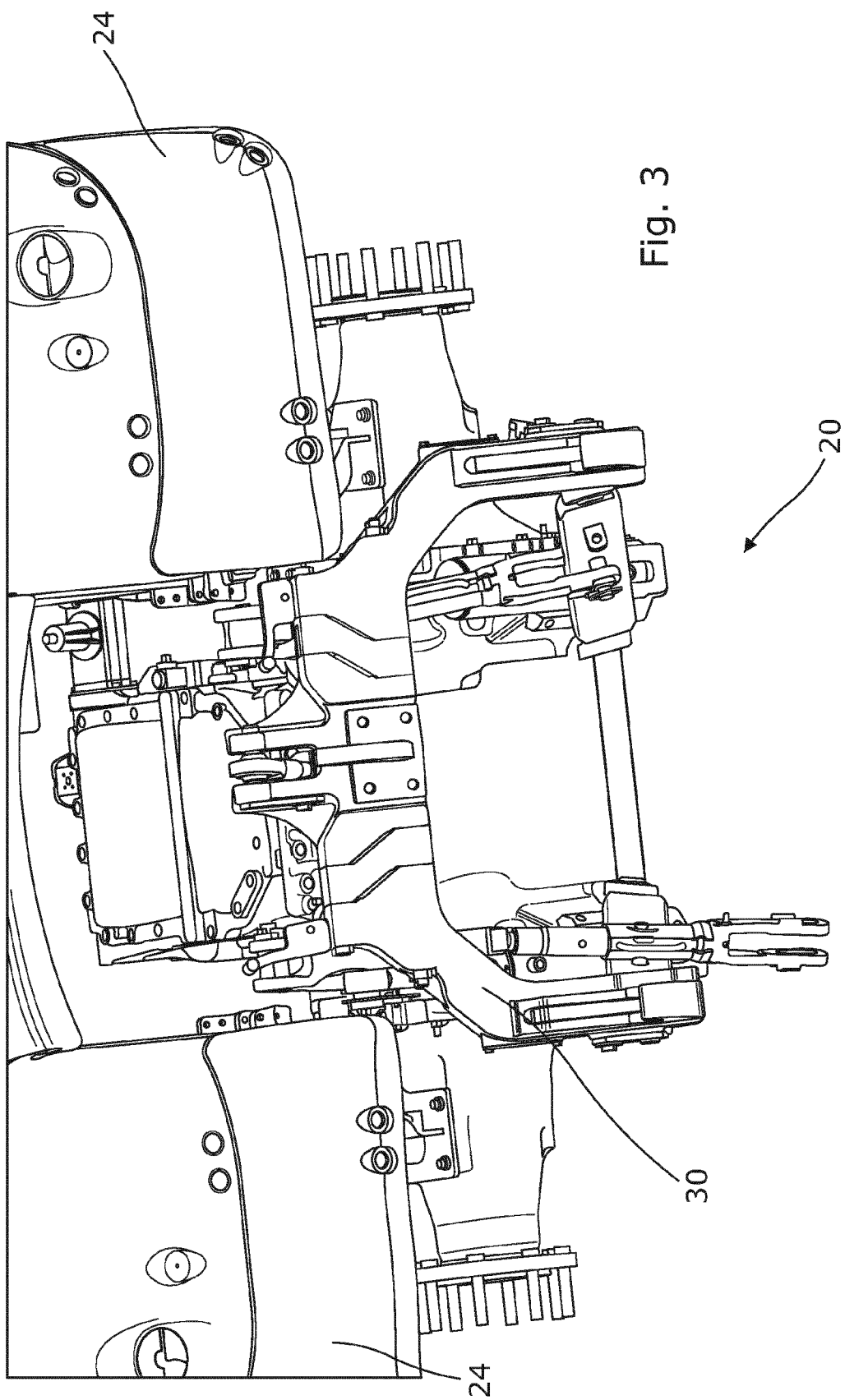
FIG. 3 is a further rear sectional view of the assembly of FIG. 2.

A rear view of the tractor 10 is shown in FIGS. 2 and 3. The rear linkage 20 comprises an upper link arm 26 and a pair of lower link arms 28 which project from the body of the tractor 10. A quick hitch assembly 30 according to the invention is provided on the rear linkage 20.

Figure 4:
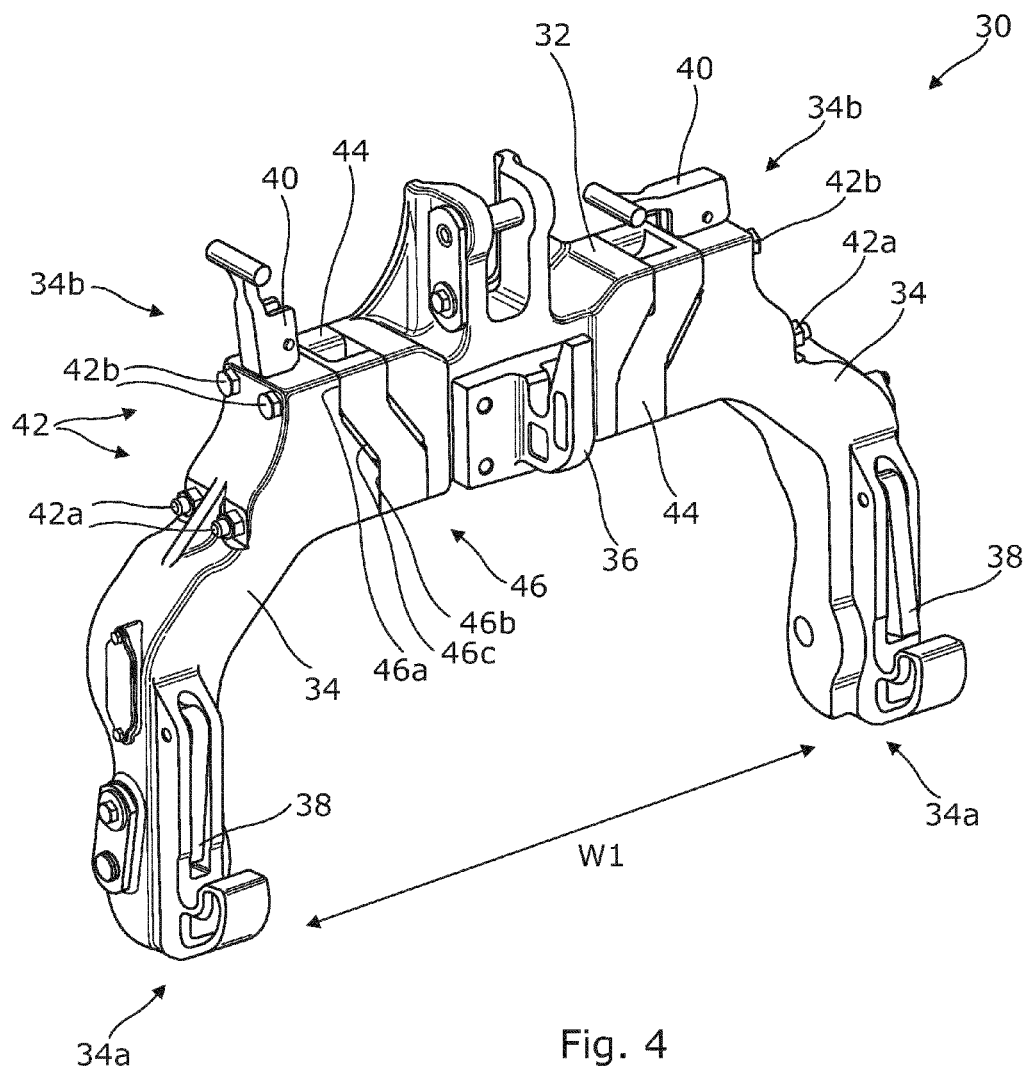
FIG. 4 is an isometric view of a quick hitch assembly according to the invention in a first configuration.
Figure 5:
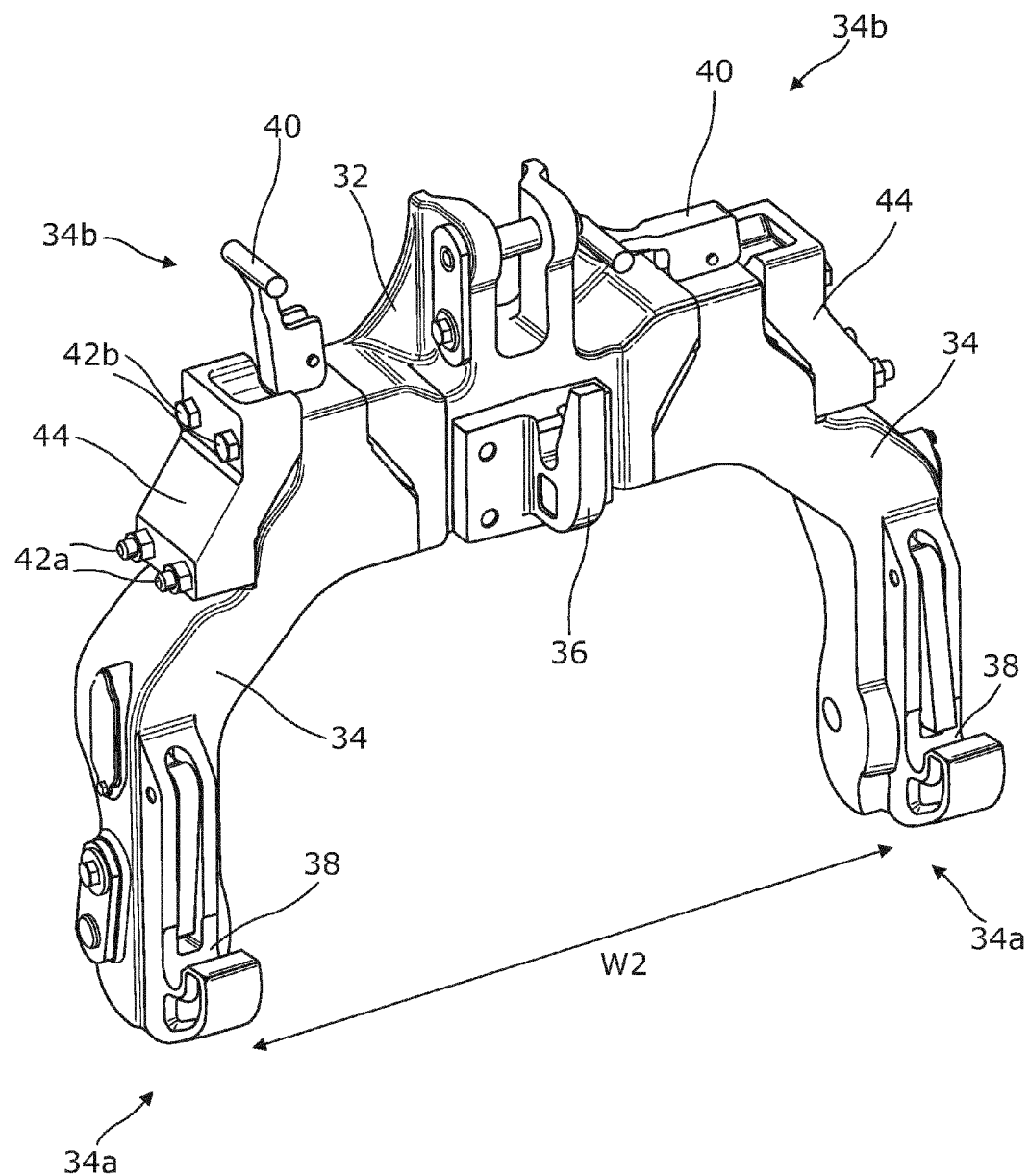
FIG. 5 is an isometric view of the quick hitch assembly of FIG. 4 in a second configuration.

With reference to the views of FIGS. 4 and 5, the quick hitch assembly 30 comprises a top link portion 32 and a pair of separate side arm portions 34. The top link portion 32 and the side arm portions 34 are coupled together to form the assembled quick hitch 30. The top link portion 32 of the quick hitch 30 is arranged to be coupled to the upper link arm 26 of the rear linkage 20, and the side arm portions 34 of the quick hitch 30 are arranged to be coupled to respective lower link arms 28 of the linkage 20.

An upper hook 36 is provided on the top link portion 32 to present an upper connection point to the quick hitch 30 for a tractor implement. Similarly, lower hooks 38 are provided on the lower, distal ends 34*a* of the side arm portions 34, to present opposed lower connection points for a tractor implement. The lower hooks 38 may be latchably controlled by levers 40 provided on the respective side arm portions 34.

The side arm portions 34 are arranged to be releasably secured to either side of the top link portion 32. The upper ends 34*b* of the side arm portions 34 may be provided with bolt apertures (not shown). Similar bolt apertures may also be provided in the body of the top link portion 32, such that the side arm portions 34 can be releasably bolted to the top link portion 32, using an array of bolts 42.

In a preferred embodiment, a first set of bolts 42*a* are arranged to extend from the top link portion 32 to be received in apertures provided on the respective side arm portions 34, while a second set of bolts 42*b* are arranged to extend from the respective side arm portions 34 to be received in apertures provided on the top link portion 32. The respective bolts may then be secured in place, e.g. using suitable threaded nuts and/or internally-threaded apertures, to form the assembled quick hitch 30.

The assembled quick hitch comprises a generally horizontal upper section, defined by the top link portion 32 and the upper ends 34*b* of the side arm portions 34, and a pair of generally vertical side sections, defined by the side arm portions 34. The lower ends 34*a* of the side arm portions 34 are preferably arranged to be horizontally offset from the upper ends 34*b* of the side arm portions 34, such that the assembled quick hitch forms a generally A-shaped frame, with a relatively narrow upper portion. Such a construction allows for the ease of use of the quick hitch on a variety of different tractor constructions, in particular for tractor constructions having reduced work space at the rear of the tractor, e.g. due to rearwardly-extending fenders 24.

The quick hitch assembly 30 further comprises a pair of complimentary spacer elements 44. The spacer elements 44 are arranged to be selectably located between the top link portion 32 and the respective side arm portions 34 of the assembly 30. Through-going bolt apertures (not shown) are defined in the spacer elements 44. The spacer elements 44 can be incorporated into the general quick hitch assembly 30, by passing securing bolts 42 through the apertures in the spacer elements 44, the bolts 42 then secured to the top link portion 32 and/or the respective side arm portions 34 arranged either side of the spacer element 44.

With reference to FIG. 4, the top link portion 32 and the upper ends 34*b* of the side arm portions 34 comprise complementary coupling faces indicated at 46 comprising a first vertical face section 46*a*, a second vertical face section 46*b* offset from the first vertical face section 46*a*, and an angled face section 46*c* extending between the first and second sections. This staggered construction allows for a distribution of forces between the elements of the quick hitch 30. It will be understood that the spacer elements 44 are provided as dogleg-shaped elements formed to correspond to the coupling faces of the top link portion 32 and the respective side arm portions 34.

In FIG. 4, the spacer elements 42 are arranged between the top link portion 32 and the respective upper ends 34*b* of the side arm portions 34, such that the assembled quick hitch 30 comprises a hitch width W1 defined between the lower distal ends 34*a* of the side arm portions 34. In FIG. 5, the spacer elements 42 are not used in the quick hitch construction, such that the side arm portions 34 are directly connected to the top link portion 32 to form a quick hitch having a hitch width W2, W2 being less than W1.

It can be seen that the selective use of the spacer elements 42 in the quick hitch assembly allows for the construction of quick hitches having adjustable hitch widths, wherein the spacer elements 42 can be easily incorporated into the overall construction, without the need for time-consuming positioning and alignment methods. It will be understood that the quick hitch assembly 30 may be provided with a plurality of spacer elements of different dimensions, allowing for the construction of a wide range of quick hitches having different hitch widths.

In FIG. 5, it can be seen that if the spacer elements 44 are not in use as part of the quick hitch construction, the unused spacer elements 44 may be stored on the assembly itself. In one aspect, the spacer elements 44 may be bolted onto the side arm portions 34. Preferably, the side arm portions 34 are provided with a recess to receive the spacer elements 44 when not in use. In a particularly preferred embodiment, the unused spaced elements 44 can be bolted to the quick hitch assembly 30 using the securing bolts 42 used to secure the side arm portions 34 to the top link portion 32.

The use of a quick hitch assembly having spacer elements selectably incorporated into the assembled quick hitch provides for an adjustable quick hitch system which is relatively easy to use.

The invention is not limited to the embodiments described herein, and may be modified or adapted without departing from the scope of the present invention.

The invention claimed is:

1. A quick hitch assembly comprising:
   a top link portion;
   a pair of side arm portions coupled with the top link portion forming an assembled quick hitch;
   at least one securing bolt; and
   one or more spacer elements selectably arranged between the top link portion and each of the pair of side arm portions, to form a plurality of different configurations of the assembled quick hitch, the different configurations having different quick hitch dimensions;
   wherein the pair of side arm portions are configured to be releasably bolted to the top link portion, wherein each of the one or more spacer elements comprise at least one through-going bolt aperture, such that each of the one or more spacer elements can be arranged between a side arm portion and the top link portion, where one of the at least one securing bolt is arranged to extend through the aperture of each of the one or more spacer elements to secure the one or more spacer elements between one of the pair of side arm portions and the top link portion, and wherein at least one of the one or more spacer elements is configured to be stored in a recess on a surface of the of one of the pair of side arm portions facing away from the top link portion when not selected to be in use.

2. The quick hitch assembly of claim 1, wherein a quick hitch width is defined between distal ends of the pair of side arm portions of the assembled quick hitch, wherein the one or more spacer elements are selectably arranged between the top link portion and each of the pair of side arm portions to define different quick hitch widths.

3. The quick hitch assembly of claim 1, wherein the assembled quick hitch comprises a generally horizontal upper section defined by the top link portion and generally vertical side sections defined by the pair of side arm portions, wherein each of the pair of side arm portions comprise an upper end for coupling to the top link portion and a lower end comprising a hitch hook element, wherein the lower end of each of the pair of side arm portions is horizontally offset from the upper end of each of the pair of side arm portions.

4. An agricultural vehicle, having a quick hitch assembly as claimed in claim 1.

5. A quick hitch assembly comprising:
a top link portion;
a pair of side arm portions coupled with the top link portion forming an assembled quick hitch; and
one or more spacer elements selectably arranged between the top link portion and each of the pair of side arm portions, to form a plurality of different configurations of the assembled quick hitch, the different configurations having different quick hitch dimensions;
wherein the top link portion and each of the pair of side arm portions comprise complementary coupling faces comprising a first vertical face section, a second vertical face section offset from the first vertical face section, and an angled face section extending between the first and second vertical face sections and wherein each of the one or more spacer elements comprise dogleg-shaped elements configured to correspond to the coupling faces of the top link portion and each of the pair of side arm portions configured to distribute forces between the top link portion and each of the pair of side arm portions.

6. The quick hitch assembly of claim 5, wherein the pair of side arm portions are configured to be releasably bolted to the top link portion, wherein each of the one or more spacer elements comprise at least one through-going bolt aperture, such that each of the one or more spacer elements can be arranged between a side arm portion and the top link portion, where at least one securing bolt is arranged to extend through the aperture of each of the one or more spacer elements to secure the one or more spacer elements between each of the pair of side arm portions and the top link portion.

7. The quick hitch assembly of claim 5, wherein at least one of the one or more spacer elements is stored on the pair of side arm portions when not selected to be in use.

8. The quick hitch assembly of claim 7, wherein the one or more spacer elements not selected to be in use is releasably bolted to the pair of side arm portions.

9. The quick hitch assembly of claim 8, wherein the one or more spacer elements are releasably bolted onto at least one of the pair of side arm portions by at least one securing bolt, the at least one securing bolt used to attach at least one of the pair of side arm portions to the top link portion.

10. The quick hitch assembly of claim 7, wherein the pair of side arm portions comprise a recess shaped to receive the one or more spacer elements when the one or more spacer elements is not in use.

11. An agricultural vehicle, having a quick hitch assembly as claimed in claim 5.

\* \* \* \* \*